United States Patent
Danskin et al.

(10) Patent No.: US 6,959,110 B1
(45) Date of Patent: Oct. 25, 2005

(54) MULTI-MODE TEXTURE COMPRESSION ALGORITHM

(75) Inventors: John M. Danskin, Cranston, RI (US); Gary M. Tarolli, Concord, MA (US); Murali Sundaresan, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 807 days.

(21) Appl. No.: 09/929,427

(22) Filed: Aug. 13, 2001

Related U.S. Application Data

(60) Provisional application No. 60/226,240, filed on Aug. 17, 2000.

(51) Int. Cl.[7] .................................................. G06K 9/00
(52) U.S. Cl. ..................... 382/166; 382/232; 382/233; 382/304; 345/582; 345/555
(58) Field of Search ............................ 382/232, 233, 382/304, 162, 166; 725/109; 345/555, 582, 345/619, 505, 585, 419, 473, 502, 418, 426; 348/207.1

(56) References Cited

U.S. PATENT DOCUMENTS

| | | | | | |
|---|---|---|---|---|---|
| 5,880,737 | A | * | 3/1999 | Griffin et al. | 345/582 |
| 6,157,743 | A | * | 12/2000 | Goris et al. | 382/233 |
| 6,243,081 | B1 | * | 6/2001 | Goris et al. | 345/555 |
| 6,326,964 | B1 | * | 12/2001 | Snyder et al. | 345/419 |

OTHER PUBLICATIONS

"Whitepaper: FXT1", http://www.reactorcritical.com/white-3dfx-fxtl/white-3dfx-fxtl.shtml.
R. F. Mariano, "STReport's NEWS.STREPORT.COM Newsgroups, VOODOO 5-5500", devprogram@3dfx.com.

* cited by examiner

Primary Examiner—Kanjibhai Patel
Assistant Examiner—Ali Bayat
(74) Attorney, Agent, or Firm—Zilka-Kotab, PC

(57) ABSTRACT

A multi-mode texture compression algorithm is provided for effective compression and decompression texture data during graphics processing. Initially, a request is sent to memory for compressed texture data. Such compressed texture data is then received from the memory in response to the request. At least one of a plurality of compression algorithms associated with the compressed texture data is subsequently identified. Thereafter, the compressed texture data is decompressed in accordance with the identified compression algorithm.

26 Claims, 4 Drawing Sheets

MULTI-MODE TEXTURE COMPRESSION ALGORITHM

RELATED APPLICATION(S)

The present application claims the priority of a provisional application filed Aug. 17, 2000 under Ser. No. 60/226,240, which is incorporated herein by reference in its entirety for all purposes.

FIELD OF THE INVENTION

The present invention relates to computer graphics processing, and more particularly to texture compression algorithms.

BACKGROUND OF THE INVENTION

In the field of computer graphics, texture mapping is a known technique used to create the appearance of complexity on the surface of rendered objects without actually having to model every detail of the object's surface. Typically, the technique involves mapping a two-dimensional function or array (the texture) onto an object in three-dimensional object space and then projecting the resultant image back to two-dimensional screen space for display. The phrase "texture map" refers to the function or array that is used in the texture mapping process. A common two-dimensional texture map might consist of a repeatable pattern for representing a material, such as wood or marble for example. Three-dimensional texture maps are also used, but not as frequently. Three-dimensional texture maps are usually larger than two-dimensional texture maps. Texture maps are made up of a plurality of numerical values called texels. A texel's numerical value usually corresponds to an RGB color value and perhaps also to an alpha transparency value. (Other parameters may be included in texture maps in addition to, or in lieu of, RGB and alpha values.) A texel's location within a texture map may be designated using s,t coordinates.

A technique known as MIP mapping is also used in texture mapping. MIP mapping involves down-sampling a base texture map numerous times to develop a series of smaller texture maps, each of which represents the base map at a predetermined lower level of resolution. Typically, a map number is assigned to each map. For example, for a system in which two textures were stored, each at four different levels of resolution, eight unique map numbers would be required to refer to the texture maps individually. In systems that use MIP mapping, not only must the base map for each texture be stored in memory, but so must each of the down-sampled maps for each texture. Thus, while texture maps yield important efficiencies for rendering complex images, they can become burdensome in terms of the amount of memory that is required to store them. Indeed, the size of the texture maps used to render an image can in some cases be larger than the rendered image itself.

One technique now being used to address the storage problem associated with texture maps is to store the texture maps in the system memory of the host computer rather than in a dedicated texture memory located within the graphics subsystem. This new technique is beneficial to the extent that it eliminates or reduces the need for a large, dedicated texture memory in the graphics subsystem. On the other hand, this new technique also creates a new problem for systems that utilize hardware rendering instead of software rendering: The rendering hardware of the graphics subsystem may make frequent use of the system bus to access large amounts of texture data stored in system memory. This places significant bandwidth demands on both the system bus and system memory.

Because of these memory space and bandwidth problems associated with texture mapping, it has become popular to logically partition stored texture maps into a number of equally-sized blocks. This is done because it is usually more efficient from a bus and memory utilization point of view to retrieve an entire block of texture data from system memory than to retrieve one texel at a time.

For the same reasons, it has also become popular to store texture maps in a compressed format. Various compression algorithms have been used for this purpose including JPEG, run-length encoding, Huffman encoding, vector quantization and Lempel-Ziv compression. Each of these algorithms may be classified in a number of different ways: First, is the algorithm lossy or lossless? Lossy algorithms frequently yield better compression rates than lossless ones, but they do so at the expense of image quality. Second, does the algorithm produce a compression ratio that is fixed or variable? In other words, will the algorithm compress every portion of an image to the same degree, or will it compress highly detailed portions of the image to a lesser degree than other portions of the image? Another factor of importance in choosing compression algorithms is whether and how easily the compressed texture data produced by the algorithm may be accessed randomly. It is often difficult to determine in advance how a given renderer will access a texture. Therefore, the ability to randomly access compressed texture data is extremely beneficial.

Yet another technique that has become popular is a combination of the above-described methods: A texture map may be logically partitioned into blocks, and then compressed one block at a time. If the compressed texture map is stored in system memory as a set of individual compressed blocks, then a desired piece of texture data may be retrieved from system memory by retrieving only the individual compressed block that contains the desired data. Using this technique, the entire compressed texture map does not have to be retrieved from memory simply to access an individual piece of texture data within it. Moreover, because the block is retrieved in compressed format, additional bus and memory bandwidth savings are realized.

One difficulty that arises when applying the foregoing methods is that of selecting an appropriate compression format for a particular block. Certain compression algorithms work better with certain types of data. For example, certain textures lend themselves to more effective compression using certain texture compression algorithms due to the specific colors or various other aspects associated with the texture data. To date, conventional texture compression algorithms apply the same compression algorithm to all blocks of texture data, irregardless of the various characteristics of the texture data.

DISCLOSURE OF THE INVENTION

A multi-mode texture compression algorithm is provided for effective compression and decompression texture data during graphics processing. Initially, a request is sent to memory for compressed texture data. Such compressed texture data is then received from the memory in response to the request. At least one of a plurality of compression algorithms associated with the compressed texture data is subsequently identified. Thereafter, the compressed texture data is decompressed in accordance with the identified compression algorithm.

Prior to sending the request, the texture data may be compressed utilizing all of the compression algorithms. The most favorable compressed texture data is then selected. As an option, the most favorable compressed texture data may be the most accurate replication of an original version of the texture data. Next, the most favorable compressed texture data is stored in the memory.

In one embodiment, a mode identifier may be stored with the compressed texture data. Moreover, the compression algorithm associated with the compressed texture data may be identified utilizing the mode identifier. Optionally, the mode identifier may include at least one mode bit.

Various specific compression algorithms may be utilized in the context of the present embodiment. For example, at least one of the compression algorithms may represent a 4×4 block of texels of the texture data utilizing two bits per texel if the texels are opaque. Further, each 4×4 block of texels may include two 16-bit colors stored in an RGB 565 format and two additional colors created by interpolating between the two 16-bit colors stored in the RGB 565 format to form a 4-entry lookup table. A 2-bit index may be adapted for being used to determine which 16-bit color from the lookup table is used for each texel of the 4×4 block of texels. Moreover, transparent texels may be represented by making one of the four 16-bit colors transparent.

Still yet, at least one of the compression algorithms may represent a 4×8 block of texels utilizing three bits per texel. Each 4×8 block of texels may include two 15-bit colors stored in an RGB 555 format and five additional colors created by interpolating between the two 15-bit colors stored in the RGB 555 format to form an 8-entry lookup table. An eighth 15-bit color may be defined to be a transparent color. Further, a 3-bit index may be used to determine which 15-bit color from the lookup table is used for each texel in the 4×8 block of texels.

In still another embodiment, at least one of the compression algorithms may represent a 4×8 block of texels utilizing two bits per texel if the texels are opaque. Each 4×8 block of texels may include four 15-bit colors in an RGB 555 format to form a 4-entry lookup table. A 2-bit index may be adapted for being used to determine which of the four 15-bit colors is assigned to each texel.

In still yet another embodiment, at least one of the compression algorithms may represent a 4×8 block of texels with two bits per texel. Each 4×8 block of texels may include three 20-bit colors stored in a 5555 format: 5 bits for each of red, green, blue, and alpha (opacity). A first and second one of the 20-bit colors may be used for primary colors of a left 4×4 sub-block of the 4×8 block of texels. Further, a second and third one of the colors may be used for primary colors of the right 4×4 sub-block of the 4×8 block of texels. Two additional 20-bit colors may be created in each 4×4 sub-block of texels by interpolating between the 20-bit colors associated with the corresponding 4×4 sub-block of texels. A 2-bit index may be adapted for being used to determine which of the four 20-bit colors is assigned to each texel. Further, a lookup table may be used to determine which 20-bit color is applied to each texel.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings.

DESCRIPTION OF THE PREFERRED EMBODIMENTS

Figure 1:
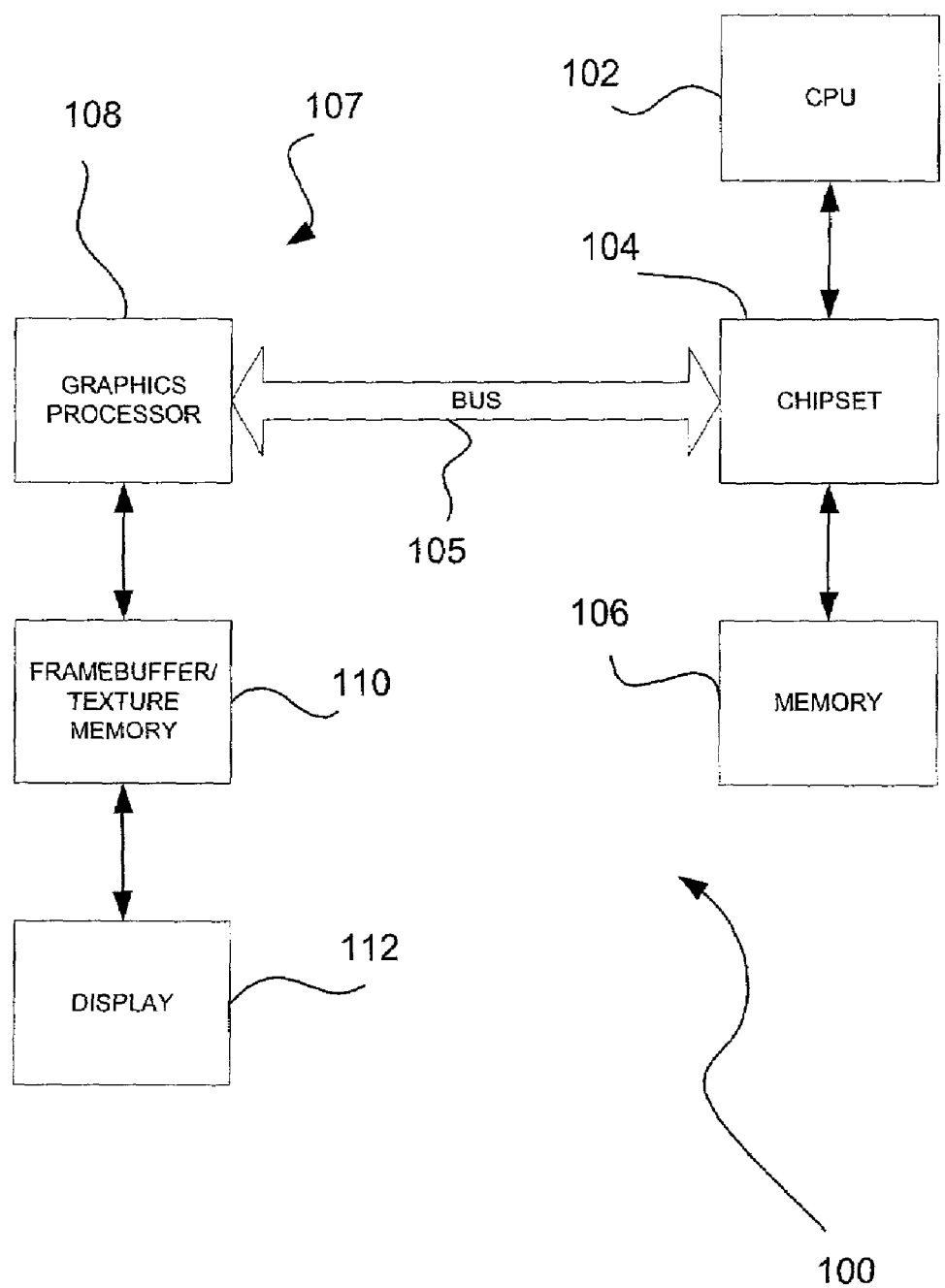
FIG. 1 illustrates an exemplary architecture in which the present embodiment may be implemented.

FIG. 1 illustrates an exemplary architecture 100 in which the present embodiment may be implemented. As shown, a central processing unit 102 is coupled to a chipset 104 which is, in turn, coupled to memory 106. In one embodiement, this memory 106 may take the form of an array of one or more dynamic RAM memory chips, or another type of storage device capable of storing data. In use, the memory 106 may be used to store large amounts of compressed texture data in a manner that will soon be set forth. Such compressed texture data is accessible by the chipset 104 under the control of the central processing unit 102.

Coupled to the chipset 104 via a bus 105 is a graphics subsystem 107 including a graphics processor 108. A frame buffer/texture memory 110 is coupled to the graphics processor 108 for populating a display 112 coupled thereto.

As will soon become apparent, compressed texture data may be stored in the memory 106, memory associated with the graphics subsystem 107, or any other memory, such as a CD-ROM or other disk drive. Such compressed texture data may further be compressed utilizing various compressed algorithms based on which format provides the most favorable results.

In use, the graphics processor 108 is capable of retrieving the compressed texture data, and identifying the particular compression format associated with the compressed texture data. The compressed texture data may then be decompressed for the purpose of texture mapping. By optimizing the compression and decompression of the texture data, the present embodiment decreases the bandwidth required to transfer the texture data and further increases the fill-rate during texture mapping.

Figure 2:
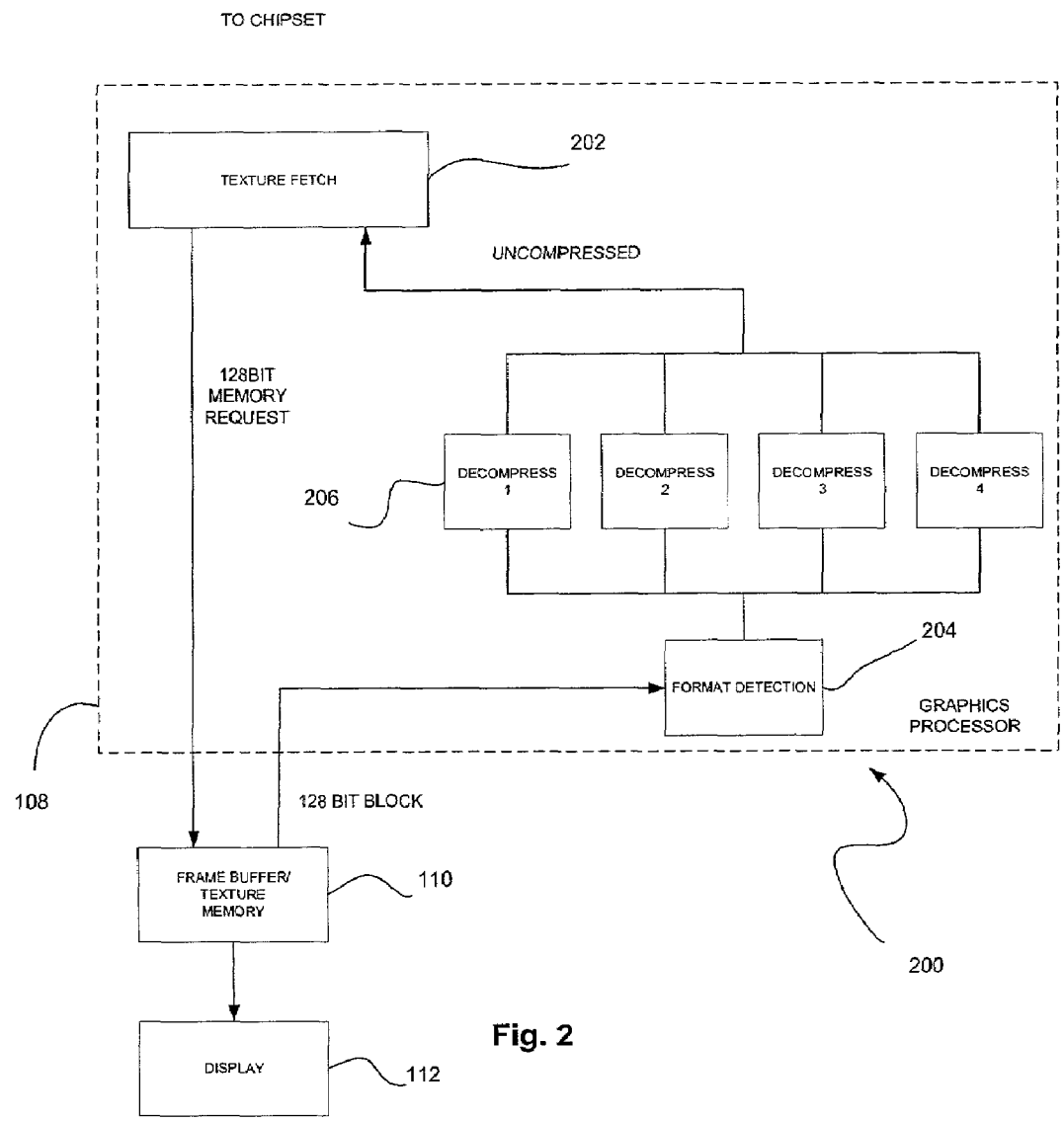
FIG. 2 illustrates a particular framework associated with the graphics processor of the exemplary architecture of FIG. 1.

FIG. 2 illustrates a particular framework 200 associated with the graphics processor 108 of the graphics subsystem 107 of FIG. 1, in accordance with one embodiment. As shown, a texture fetch module 202 is provided for sending a request for compressed texture data to the frame buffer/texture memory 110, and receiving the compressed texture data from the frame buffer/texture memory 110. In one embodiment, 128-bits of compressed texture data may be requested and retrieved from the frame buffer/texture memory 110.

Coupled to the frame buffer/texture memory 110 is a format detection module 204. In use, the format detection module 204 is adapted for identifying at least one of a plurality of compression algorithms associated with the compressed texture data requested from the frame buffer/ texture memory 110. More information on the various specific compression algorithms will be set forth hereinafter in greater detail.

A plurality of decompression modules 206 are coupled between the texture fetch module 202 and the format detection module 204. The decompression modules 206 are adapted for decompressing the compressed texture data in accordance with the compression algorithm identified by the format detection module 204. While not shown, it should be noted that the graphics processor 108 and/or other components of the graphics subsystem 107 may include additional conventional functionality such as transform, lighting, etc.

Figure 3:
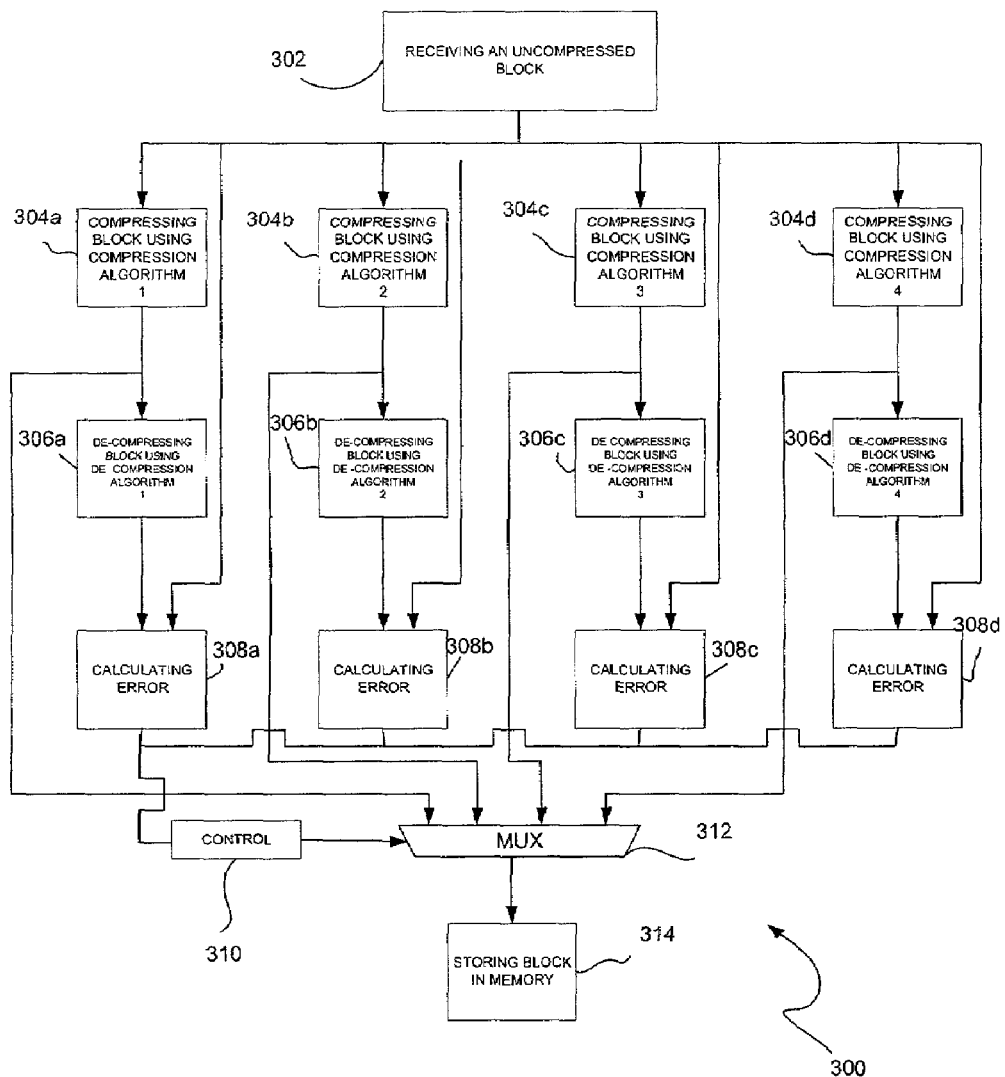
FIG. 3 shows the manner in which texture data is compressed and stored in memory for use by the foregoing architecture.

FIG. 3 illustrates the manner in which texture data is compressed and stored in memory for use by the foregoing architecture. As mentioned earlier, compressed texture data may be stored in the memory 106, memory associated with the graphics subsystem 107, or any other memory.

In use, uncompressed texture data is initially received in operation 302 for compression purposes. In one embodiment, the texture data may be received in blocks. For example, the texture data may be received in 4×8 or 4×4 blocks.

It should be noted that the blocks of texture data may be compressed on or off the architecture 100 of FIG. 1. In one embodiment, the texture data may be compressed on a CD-ROM and read by the architecture 100 of FIG. 1. In another embodiment, the texture data may be compressed by the central processing unit 102 and immediately stored on the architecture 100 of FIG. 1. Of course, the texture data may be compressed in any desire manner and in any particular environment.

As shown in FIG. 3, the uncompressed texture data is compressed by a plurality of compression algorithms in operations 304a–d. Thereafter, in operations 306a–d, the compressed texture data is decompressed utilizing a plurality of de-compression algorithms that are complimentary to the compression algorithms in operations 304a–d.

The output of the operations 306a–d is then compared to the original uncompressed texture data in operations 308a–d for determining an amount of error. In one embodiment, such error may take the form of a distance metric. It should be understood that the lowest amount of error reflects the most favorable compression algorithm. In various other embodiments, the most favorable compression algorithm may be gauged utilizing any desired criteria such as compression size, etc. The results of such comparison are then used by a control module 310 for controlling a multiplexer 312 to store the most favorable results to memory in operation 314.

The compressed texture data is then ready for being accessed by the graphics processor 108 for an improved decompression algorithm. For reasons that will soon become apparent, each of the compression algorithms is capable of storing particular mode bits with the compressed texture data for the purpose of identifying the compression algorithm. More information on the various specific compression algorithms will be set forth hereinafter in greater detail.

Figure 4:
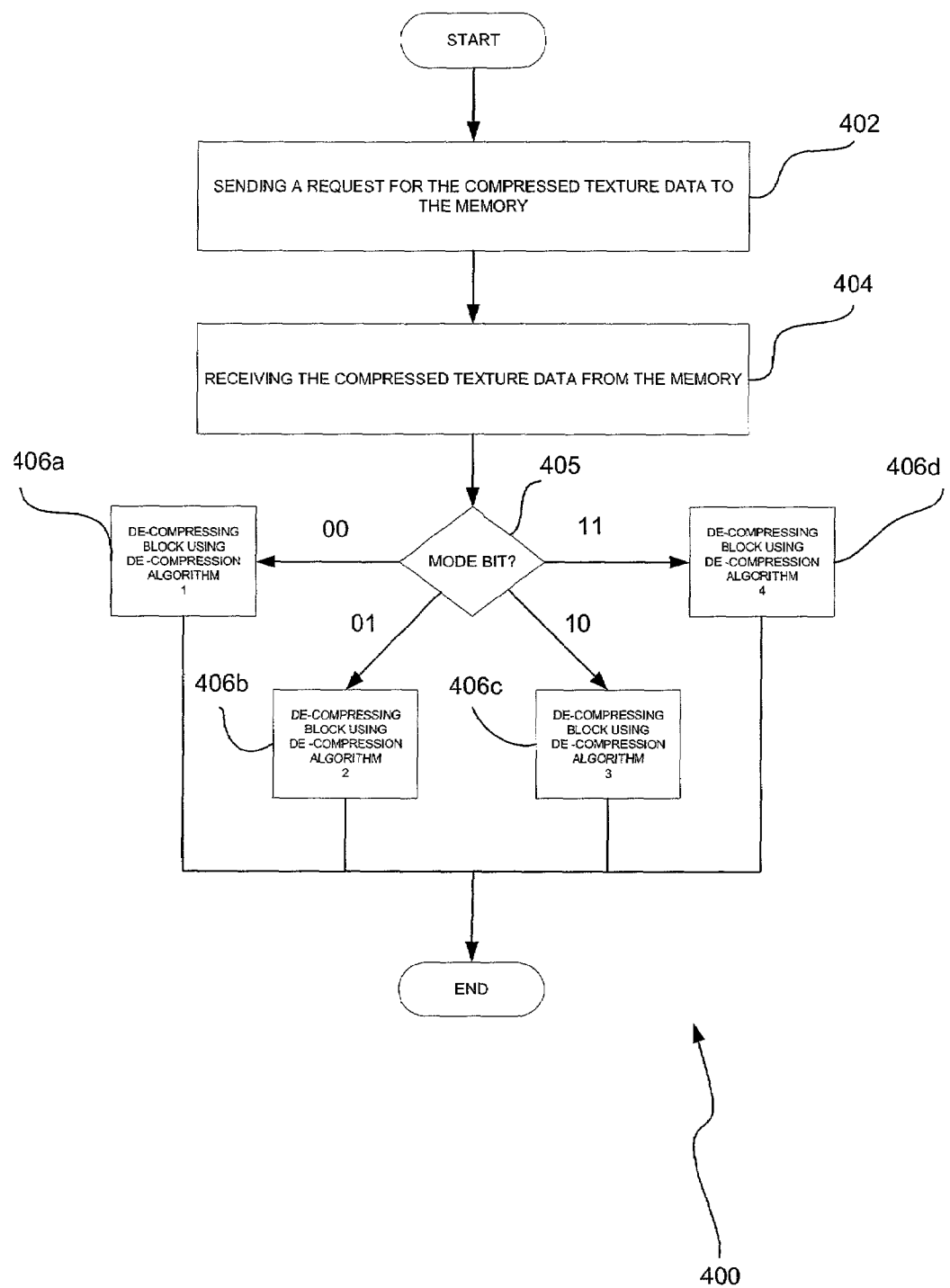
FIG. 4 illustrates a texture data compression method for use during graphics processing, in accordance with one embodiment.

FIG. 4 illustrates a texture data compression method 400 for use during graphics processing. Initially, in operation 402, a request is sent to memory for compressed texture data. In one embodiment, such request may be made by a texture fetch module 202 like that shown in FIG. 2. Of course, however, the request may be made by the central processing unit 102 of FIG. 1, another module associated with the graphics subsystem 107 or any logic for that matter.

Next, in operation 404, such compressed texture data is received from the memory in response to the request. At least one of a plurality of compression algorithms associated with the compressed texture data is subsequently identified. This may be accomplished by determining mode bits associated with the compressed texture data in decision 405. In one embodiment, such compressed texture data may be received by the format detection module 204 like that shown in FIG. 2. Of course, however, the compressed texture data may be received by the central processing unit 102 of FIG. 1, another module associated with the graphics subsystem 107 or any logic for that matter.

Thereafter, the compressed texture data is decompressed in accordance with the identified compression algorithm in operations 406a–d. Various specific decompression algorithms may be utilized in the context of the present embodiment. Each of such decompression algorithms is a compliment of a particular compression algorithm. In one embodiment, the decompression may be accomplished by the decompression modules 206 like those shown in FIG. 2. Of course, however, the decompression may be accomplished by the central processing unit 102 of FIG. 1, another module associated with the graphics subsystem 107 or any logic for that matter.

Four examples of the aforementioned compression algorithms will now be set forth. It should be noted that more or less various other compression algorithms may be utilized per the desires of the user.

In one embodiment, each of the formats compress an 8×4 texel blocks into 128 bits. During the compression phase, one of the four formats for each block is selected based on which encoding scheme results in the best overall visual quality.

Unused pixel locations along the right or bottom edges within a block may contain a repetition of the values in used locations. The total size of an image is ceil (width/8)*ceil (height/4)*16 bytes.

In each compression format, the 32 texels of the 8×4 block are partitioned into two 4×4 sub-blocks according to the diagram shown in Table 1.

TABLE 1

| t0  | t1  | t2  | t3  | t16 | t17 | t18 | t19 |
| t4  | t5  | t6  | t7  | t20 | t21 | t22 | t23 |
| t8  | t9  | t10 | t11 | t24 | t25 | t26 | t27 |
| t12 | t13 | t14 | t15 | t28 | t29 | t30 | t31 |

By way of summary, a first one of the compression algorithms may represent a 4×8 block of texels utilizing three bits per texel. Each 4×8 block of texels may include two 15-bit colors stored in an RGB 555 format and five additional colors created by interpolating between the two 15-bit colors stored in the RGB 555 format to form an 8-entry lookup table. An eighth 15-bit color may be defined to be a transparent color. Further, a 3-bit index may be used to determine which 15-bit color from the lookup table is used for each texel in the 4×8 block of texels. The present compression algorithm works well when colors are "peppered" about in an image, and or generally unorganized. Further, more area is covered by the present compression algorithm. Thus, the present compression algorithm is ideal for spatial resolution.

A second one of the compression algorithms may represent a 4×8 block of texels utilizing two bits per texel if the texels are opaque. Each 4×8 block of texels may include four 15-bit colors in an RGB 555 format to form a 4-entry lookup table. A 2-bit index may be adapted for being used to determine which of the four 15-bit colors is assigned to each texel. Thus, the present compression algorithm is ideal for complex color areas.

A third one of the compression algorithms may represent a 4×4 block of texels of the texture data utilizing two bits per texel if the texels are opaque. Further, each 4×4 block of texels may include two 16-bit colors stored in an RGB 565 format and two additional colors created by interpolating between the two 16-bit colors stored in the RGB 565 format to form a 4-entry lookup table. A 2-bit index may be adapted for being used to determine which 16-bit color from the lookup table is used for each texel of the 4×4 block of texels. Moreover, transparent texels may be represented by making one of the four 16-bit colors transparent.

Still yet, a fourth one of the compression algorithms may represent a 4×8 block of texels with two bits per texel. Each 4×8 block of texels may include three 20-bit colors stored in a 5555 format. A first and second one of the 20-bit colors may be used for primary colors of a left 4×4 sub-block of the 4×8 block of texels. Further, a second and third one of the colors may be used for primary colors of the right 4×4 sub-block of the 4×8 block of texels. Two additional 20-bit colors may be created in each 4×4 sub-block of texels by interpolating between the 20-bit colors associated with the corresponding 4×4 sub-block of texels. A 2-bit index may be adapted for being used to determine which of the four 20-bit colors is assigned to each texel. Further, a lookup table may be used to determine which 20-bit color is applied to each texel. The present compression algorithm is ideally suited for situations where colors span across the screen, blending with other colors.

When the texture data is compressed, a mode identifier (i.e. 2-bit field) is stored in each block and is used to determine which of the four foregoing compression schemes was utilized for best visual quality. Depending on which algorithm is used for a given block, the proper decompression logic is applied to generate decoded 32-bit texels which can then be used by texture mapping hardware of the graphics subsystem.

More information will now be set forth regarding the format associated with each of the foregoing four compression algorithms.

First Compression Format (CC_HI)

Table 2 summarizes the first compression format.

TABLE 2

| bit 127 | (rgb555) | | (3-bit/texel) | |
|---|---|---|---|---|
| mode [1:0] | color1 | color0 | texel 31 to 16 | texel 15 to 0 |
| 2 | 15 | 15 | 48 | 48 |
| [127:126] | mode[1:0] | | | |
| [125:121] | red of color1 | | | |
| [120:116] | green of color1 | | | |
| [115:111] | blue of colon | | | |
| [110:106] | red of color0 | | | |
| [105:101] | green of color0 | | | |
| [100:96] | blue of color0 | | | |
| [95:93] | texel 31 | | | |
| ... | | | | |
| [50:48] | texel 16 | | | |

TABLE 2-continued

| bit 127 | (rgb555) | | (3-bit/texel) | |
|---|---|---|---|---|
| mode [1:0] | color1 | color0 | texel 31 to 16 | texel 15 to 0 |
| [47:45] | texel 15 | | | |
| ... | | | | |
| [2:0] | texel 0 | | | |

In the first format, mode=00b, the 15-bit color1(RGB555 format) and color0(RGB555 format) colors are converted into 24-bit RGB888 colors by duplicating the upper 3 bits for the 3 LSBs. The 24-bit converted color1 and color0 are then used to linearly interpolate 5 more levels of color to create seven total levels of colors and 1 alpha (transparent) color. The first seven colors have alpha=ffh (opaque), while the eighth color is defined to be transparent black (r,g,b=00h, alpha=00h).

These eight 32-bit colors are used as the contents of an 8-entry (3 bit index) lookup table. For all 32 texels in the block, each texel's 3-bit index value is used to index the lookup table, the output from the lookup table representing the 32-bit color (ARGB8888) for that texel.

Table 3 illustrates the manner in which RGB888 colors are generated from RGB555 colors.

TABLE 3

| | |
|---|---|
| Color1 (red) = | {[125:121], [125:123]} |
| Color1 (green) = | {[120:116], [120:118]} |
| Color1 (blue) = | {[115:111], [115:113]} |
| Color0 (red) = | {[110:106], [110:108]} |
| Color0 (green) = | {[105:101], [105:103]} |
| Color0 (blue) = | {[100:96], [100:98]} |

Table 4 illustrates the manner in which the seven ARGB8888 colors are created from two RGB888 colors (operations performed individually for each color channel).

TABLE 4

Color[0] = color0[r,g,b], alpha[0] = ffh
Color[1] = (5*color0[r,g,b] + color1[r,g,b] +3)/6 alpha[1] = ffh
Color[2] = (4*color0[r,g,b] + 2*color1[r,g,b] +3)/6 alpha[2] = ffh
Color[3] = (3*color0[r,g,b] + 3*color1[r,g,b] +3)/6 alpha[3] = ffh
Color[4] = (2*color0[r,g,b] + 4*color1[r,g,b] +3)/6 alpha[4] = ffh
Color[5] = (color0[r,g,b] + 5*color1[r,g,b] +3)/6 alpha[5] = ffh
Color[6] = color1[r,g,b], alpha[6] = ffh
Color[7] = where r,g,b = 00h, alpha[7] = 00h Table 5 illustrates the table lookup associated with Table 4.

TABLE 5

| 3-bit index of texel 31 to texel 0 | Color for texel 31 to texel 0 (ARGB8888) |
|---|---|
| 0 | color[0] => {a[7:0],r[7:0],g[7:0],b[7:0]} |
| 1 | color[1] |
| 2 | color[2] |
| 3 | color[3] |
| 4 | color[4] |
| 5 | color[5] |
| 6 | color[6] |
| 7 | color[7] |

Second Compression Format (CC_CHROMA)

Table 6 summarizes the second compression format.

TABLE 6

| bit 127 Mode[2:0] 3 | (rgb555) unused 1 | color3 15 | color2 15 | color1 15 | color0 15 | texel 31 to 16 32 | (2-bit/texel) texel 15 to 0 32 |
|---|---|---|---|---|---|---|---|
| [127:125] | | | | mode[2:0] | | | |
| [124] | | | | unused | | | |
| [123:119] | | | | color3 (r5) | | | |
| [118:114] | | | | color3 (g5) | | | |
| [113:109] | | | | color3 (b5) | | | |
| [108:104] | | | | color2 (r5) | | | |
| [103:99] | | | | color2 (g5) | | | |
| [98:94] | | | | color2 (b5) | | | |
| [93:89] | | | | color1 (r5) | | | |
| [88:84] | | | | color1 (g5) | | | |
| [83:79] | | | | color1 (b5) | | | |
| [78:74] | | | | color0 (r5) | | | |
| [73:69] | | | | color0 (g5) | | | |
| [68:64] | | | | color0 (b5) | | | |
| [63:62] | | | | texel 31 | | | |
| . | | | | | | | |
| . | | | | | | | |
| . | | | | | | | |
| [33:32] | | | | texel 16 | | | |
| [31:30] | | | | texel 15 | | | |
| . | | | | | | | |
| . | | | | | | | |
| . | | | | | | | |
| [1:0] | | | | texel 0 | | | |

In the second format, mode=010b, the 15-bit colors color[3:0] (RGB555) are converted into 24-bit RGB888 colors the same as in the first format via bit replication. Color3 to Color0 are used as they are (after conversion to RGB888 format), but without interpolation. The 24-bit converted colors color3, color2, color1, and color0 are used as the contents of a 4-entry (2-bit index) lookup table. The Alpha channel of the output of the lookup table is opaque (ffh), regardless of the 2-bit index value. The 32-bit (ARGB8888) color value for each texel is obtained by performing table lookup using that texel's 2-bit index.

Table 7 illustrates the table lookup associated with the second format.

TABLE 7

| 2-bit index of texel 31 to texel 0 | Color for texel 31 to texel 0 (ARGB8888) |
|---|---|
| 0 | color0, alpha = ffh |
| 1 | color1, alpha = ffh |
| 2 | color2, alpha = ffh |
| 3 | color3, alpha = ffh |

Third Compressed Texture Format (CC_MIXED)

Table 8 summarizes the third compression format.

TABLE 8

| bit 127 mode[0] 1 | gLSB[1:0] 2 | alpha[0] 1 | (rgb555) color3 15 | color2 15 | color1 15 | color0 15 | texel 31 to 16 32 | (2-bit/texel) texel 15 to 0 32 |
|---|---|---|---|---|---|---|---|---|
| [127] | | | | | mode [0] | | | |
| [126:125] | | | | | gLSB [1:0] (LSBs of green for color 1 & color 3) | | | |
| [124] | | | | | alpha [0] | | | |
| [123:119] | | | | | color3 (r5) | | | |
| [118:114] | | | | | color3 (g5) | | | |
| [113:109] | | | | | color3 (b5) | | | |
| [108:104] | | | | | color2 (r5) | | | |
| [103:99] | | | | | color2 (g5) | | | |
| [98:94] | | | | | color2 (b5) | | | |
| [93:89] | | | | | color1 (r5) | | | |
| [88:84] | | | | | color1 (g5) | | | |
| [83:79] | | | | | color1 (b5) | | | |
| [78:74] | | | | | color0 (r5) | | | |
| [73:69] | | | | | color0 (g5) | | | |
| [68:64] | | | | | color0 (b5) | | | |
| [63:62] | | | | | texel 31 | | | |
| . | | | | | | | | |
| . | | | | | | | | |
| . | | | | | | | | |
| [33:32] | | | | | texel 16 | | | |
| [31:30] | | | | | texel 15 | | | |
| . | | | | | | | | |
| . | | | | | | | | |
| . | | | | | | | | |
| [1:0] | | | | | texel 0 | | | |

In the third format, mode[0]=1 (only one bit), color2 and color3 are used for texels 31 to 16, and color0 and color1 are used for texels 15 to 0. When alpha[0]=0, the two pairs of colors (colors 0 and 1 for texels 15 to 0 and colors 2 and 3 for texels 31 to 16) are interpreted as 16-bit RGB565 colors. For color1 and color3, the LSB (bit 0) of the green channel comes from the gLSB bits (color1.green[0]=bit 125, color3.green[0]=bit 126). For color0 and color2, the LSB (bit 0) of the green channel comes from the upper select bit for texel 0 and texel 16, respectively (color0.green[0]=bit 1 xor bit 125, color2.green[0]=bit 33 xor bit 126). The two 16-bit colors are then expanded to a 24-bit RGB888 format by bit replication (most significant bits replicated in the least significant bits), and are then used to create 2 more levels of color in between the color0/2 and color1/3 values through linear interpolation. A total of 4 colors are therefore available for 2-bit index per texel selection.

When alpha[0]=1, color0 and color2 are interpreted as 15-bit RGB555 colors, and color1 and color3 are interpreted as RGB565 colors. For color0 and color2, the 15-bit RGB555 colors are expanded to 24-bit RGB888 colors by bit replication. For color1 and color3, the LSB (bit 0) of the green channel comes from the gLSB bits (color1.green[0] bit 125, color3.green[0]=bit 126), and then bit replication is used to convert from the 16-bit RGB565 format to a 24-bit RGB888 format. A third color is created by linear interpolation (interpolating between the converted 24-bit RGB888 color0 and color1 for texels 15 to 0, and interpolating between the converted 24-bit RGB888 color2 and color3 for texels 31 to 16).

A fourth color (texel index 0x3) is defined to be transparent black (r,g,b=00h, alpha=00h). A total of 4 colors are therefore available for 2-bit index per texel selection. The 32-bit (ARGB8888) color value for all texels is obtained by performing a table lookup using each texel's 2-bit index.

Table 9 illustrates the manner in which the 24-bit (RGB888) base colors color3 and color2 are created.

TABLE 9

| | |
|---|---|
| Color3(red) = | {[123:119], [123:121]} |
| Color3(green) = | {[118:114], [126], [118:117]} |
| Color3(blue) = | {[113:109], [113:111]} |
| Color2(red) = | {[108:104], [108:106]} |
| Color2(green) = | (alpha[0] = 1) ? {[103:99], [103:101]} : {[103:99], [33] ^ [126], [103:102]} |
| Color2(blue) = | {[98:94], [98:96]} |

Table 10 illustrates the manner in which the 24-bit (RGB888) base colors color1 and color0 are created.

TABLE 10

| | |
|---|---|
| Color1(red) = | {[93:89], [93:91]} |
| Color1(green) = | {[88:84], [125], [88:87]} |
| Color1(blue) = | {[83:79], [83:81]} |
| Color0(red) = | {[78:74], [78:76]} |
| Color0(green) = | (alpha[0] = 1) ? {[73:69], [73:71]}:{[73:69], [1] ^ [125], [73:72]} |
| Color0(blue) = | {[68:64], [68:66] } |

When alpha[0]=0, because one of the texel select bits is used to determine a bit of color0 and color2, the compressor may have to perform some very tricky operations. Table 11 illustrates the method as to how to generate color0 and color1 and the associated select bits (the same method applies to determining the LSB of green for color2 and color3).

TABLE 11

1. Determine the 16-bit RGB565 color values for color0 & color1.
2. Determine the select bits for each pixel in the 4x4 sub-block.
3. If (pixel[0].select[1] != color0.green[0]^color1.green[0]) then swap color0 &color1, and invert all the select bits.

Table 12 shows psuedo-C code to generate bits 0–31, bits 64–93 & bit 125 based on the initial color0, color1 and pixel indices.

TABLE 12

```
    struct RGB565 {Byte red; Byte green; Byte blue};
    struct CSels {Byte index[16]};
    // cc_mixed_right_half derives bits[93:64] of the 128
bit data word of a
    // CC_MIXED non-alpha compression block and returns them
in 'bits_64_to_31'.
    // Plus, as a bonus, you will receive bit 125,
containing the LSB of
    // the green channel of color1, and bits_0_to_31,
containing all of the pixel indices.
    void
    cc_mixed_right_half( RGB565 color0, RGB565 color1,
            CSels pix,
            Dword &bits_0_to_31,
            Dword &bits_64_to_93,
            Bit &bit125)
    {
      RGB565 o_color0;
      RGB565 o_color1;
      // Determine if we need to switch color0 & color1
      if (((pix.index[0] >> 1) & 1) != ((color0.green ^
color1.green) & 1)) {
          o_color1 = color0;
          o_color0 = color1;
          for (int i=0; i<16; i++)
              pix.index[i] = ~pix.index[i] & 3;
      } else {
          o_color0 = color0;
          o_color1 = color1;
      }
      // Save LSB of color1.green in bit125
      bit125 = o_color1.green & 1;
      // Convert color0 & color1 to RGB555, and then munge
into bits 64 to 93
      o_color0.green >>= 1;
      o_color1.green >>= 1;
      bits_64_to_93 = ( (o_color1.red<<25) |
(o_color1.green<<20) | (o_color1.blue<<15)
            | (o_color0.red<<10) | (o_color0.green<<5)
| (o_color0.blue) ) ;
      // Munge the pixel indices into bits 0 to 31
      bits_0_to_31 = 0;
      for (int i=0; i<16; i++)
          bits_0_to_31 |= pix.index[i] << (i*2);
    }
```

Table 13 shows the manner in which the 4-entry lookup table for texels 31 to 16 is generated.

TABLE 13

```
    If alpha[0] = 0,
        Color[0] = color2[r,g,b], alpha=ffh
        Color[1] = (2 * color2[r,g,b] + color3[r,g,b] + 1)
/ 3, alpha=ffh
        Color[2] = (color2[r,g,b] + 2 * color3[r,g,b] +1)
/ 3, alpha=ffh
        Color[3] =color3[r,g,b], alpha=ffh
    If alpha [0] =1,
        Color[0] = color2[r,g,b], alpha=ffh
        Color[1] = (color2[r,g,b] + color3[r,g,b]) / 2,
alpha=ffh
        Color[2] = color3[r,g,b], alpha=ffh
        Color[3] = [a,r,g,b] = 00h
```

Table 14 shows the manner in which the 4-entry lookup table for texels 15 to 0 is generated.

TABLE 14

If alpha[0]=0,
    Color[0] = color0[r,g,b], alpha=ffh
    Color[1] = (2 * color0[r,g,b] + color1[r,g,b] + 1) / 3, alpha=ffh
    Color[2] = (color0[r,g,b] + 2 * color1[r,g,b] + 1) / 3, alpha=ffh
    Color[3] = color1[r,g,b], alpha=ffh
If alpha [0]=1,
    Color[0] = color0[r,g,b], alpha=ffh
    Color[1] = (color0[r,g,b] + color1[r,g,b]) / 2, alpha=ffh
    Color[2] = color1[r,g,b], alpha=ffh
    Color[3] = [a,r,g,b] = 00h Table 15 illustrates the resultant table lookup.

TABLE 15

| 2-bit index of texel 31 to texel 0 | Color for texel 31 to texel 0 ARGB8888 |
|---|---|
| 0 | color[0], {a[7:0], r[7:0], g[7:0], b[7:0]} |
| 1 | color[1] |
| 2 | color[2] |
| 3 | color[3] |

Fourth Compressed Texture Format (CC_ALPHA)
Table 16 summarizes the fourth compression format.

TABLE 16

| bit 127 mode[2:0] 3 | lerp 1 | alpha2 5 | alpha1 5 | (argb5555) alpha0 5 | color2 15 | color1 15 | color0 15 | (2-bit/texel) texel 31 to 16 32 | texel 15 to 0 32 |
|---|---|---|---|---|---|---|---|---|---|
| [127:125] | | | | mode[2:0] | | | | | |
| [124] | | | | lerp | | | | | |
| [123:119] | | | | color2 (a5) | | | | | |
| [118:114] | | | | color1 (a5) | | | | | |
| [113:109] | | | | color0 (a5) | | | | | |
| [108:104] | | | | color2 (r5) | | | | | |
| [103:99] | | | | color2 (g5) | | | | | |
| [98:94] | | | | color2 (b5) | | | | | |
| [93:89] | | | | color1 (r5) | | | | | |
| [88:84] | | | | color1 (g5) | | | | | |
| [83:79] | | | | color1 (b5) | | | | | |
| [78:74] | | | | color0 (r5) | | | | | |
| [73:69] | | | | color0 (g5) | | | | | |
| [68:64] | | | | color0 (b5) | | | | | |
| [63:62] | | | | texel 31 | | | | | |
| . | | | | | | | | | |
| . | | | | | | | | | |
| . | | | | | | | | | |
| [33:32] | | | | texel 16 | | | | | |
| [31:30] | | | | texel 15 | | | | | |
| . | | | | | | | | | |
| . | | | | | | | | | |
| . | | | | | | | | | |
| [1:0] | | | | texel 0 | | | | | |

In the fourth format, mode[2:0]=011b, three 20-bit colors color2, color1 and color0(ARGB5555) are converted to a 32-bit (ARGB8888) format by duplicating the upper 3-bits for the 3 LSBs (all the color channels and the alpha channel are converted from 5-bit formats to 8-bit formats using this bit duplication).

Table 17 illustrates the manner in which the 32-bit (RGB8888) base colors color2, color1, and color0 are created.

TABLE 17

| Color2(alpha) = | {[123:119], [123:121]} |
|---|---|
| Color2(red) = | {[108:104], [108:106]} |
| Color2(green) = | {[103:99], [103:101]} |
| Color2(blue) = | {[98:94], [98:96]} |
| Color1(alpha) = | {[118:114], [118:116]} |
| Color1(red) = | {[93:89], [93:91]} |
| Color1(green) = | {[88:84], [88:86]} |
| Color1(blue) = | {[83:79], [83:81]} |
| Color0(alpha) = | {[113:109], [113:111]} |
| Color0(red) = | {[78:74], [78:76]} |
| Color0(green) = | {[73:69], [73:71]} |
| Color0(blue) = | {[68:64], [68:66]} |

When lerp=0 (bit 124=0), the converted 32-bit colors color2, color1, and color0 are used directly as the first 3 entries in the 4-entry lookup table. The last entry in the 4-entry lookup table, accessed with index=3, is defined to be transparent black (rgb=00 h, alpha=00 h). A total of 4 colors are therefore available for 2-bit index per texel selection, and the 32-bit (ARGB8888) color value for all texels is obtained by performing table lookup using each texel's 2-bit index.

Table 18 illustrates the table lookup (when lerp=0).

TABLE 18

| Index of texel 31 to 0 | Color for texel 31 to texel 0 (ARGB8888) |
|---|---|
| 0 | Color[0] = color0 alpha = alpha0 |
| 1 | Color[1] = color1 alpha = alpha1 |
| 2 | Color[2] = color2 alpha = alpha2 |
| 3 | Color[3] = 000000h alpha = 00h |

When lerp=1 (bit 124=1), the converted 32-bit colors color2 and color1 are used as the 32-bit base colors for texels 31 to 16, and the converted 32-bit colors color1 and color0 are used as the base colors for texels 15 to 0. The 32-bit base colors are then used to create 2 more levels of color through linear interpolation. A total of 4 colors are therefore available for 2-bit index per texel selection, and the 32-bit (ARGB8888) color value for all texels is obtained by performing table lookup using each texel's 2-bit index.

Table 19 illustrates the manner in which the 4 colors used in the 4-entry lookup table are created from the 32-bit base colors (when lerp=1).

TABLE 19

For texel 31 to texel 16
  Color[0] = = color2[a,r,g,b]
  Color[1] = (2 * color2[a,r,g,b] + color1[a,r,g,b] + 1)/3
  Color[2] = (color2[a,r,g,b] + 2 * color1[ar,g,b] + 1)/3
  Color[3] = color1[a,r,g,b]
For texel 15 to texel 0
  Color[0] = color0[a,r,g,b]
  Color[1] = (2 * color0[a,r,g,b] + color1[a,r,g,b] + 1)/3
  Color[2] = (color0[a,r,g,b] + 2 * color1[a,r,g,b] + 1)/3
  Color[3] = color1[a,r,g,b]

Table 20 illustrates the table lookup (when lerp=1).

TABLE 20

| Index of texel 31 to 0 | Color for texel 31 to texel 0 ARGB8888) |
|---|---|
| 0 | color[0] |
| 1 | color[1] |
| 2 | color[2] |
| 3 | color[3] |

The present embodiment thus creates images with higher quality than other texture compression schemes by using multiple compression techniques for each texture. This allows the compressor to be more accurate in reproducing specific portions of an image and/or different types of images as the best possible technique is applied to each texel block.

Further, unlike prior art compression schemes which use an 8-bit compression format when compressing textures with multi-bit alpha components (alpha is used for transparency information), the present embodiment is capable of using a 4-bit format for a better compression ratio. As a result, the compression ratio of the present compression algorithm is twice that of the prior art algorithms when compressing 16 or 32-bit textures which include alpha information. This substantially increases the number of textures which can be stored in a given amount of memory, and also reduces the amount of bandwidth required for texturing.

While various embodiments have been described above, it may be understood that they have been presented by way of example only, and not limitation. Thus, the breadth and scope of a preferred embodiment may not be limited by any of the above described exemplary embodiments, but may be defined only in accordance with the following claims and their equivalents.

What is claimed is:

1. A multi-mode texture decompression method for use during graphics processing, comprising;
  (a) sending a request for compressed texture data to memory;
  (b) receiving the compressed texture data from the memory;
  (c) identifying at least one of a plurality of compression algorithms associated with the compressed texture data; and
  (d) decompressing the compressed texture data in accordance with the identified compression algorithm:
    wherein, prior to sending the request, the texture data is compressed utilizing each of the plurality of compression algorithms, the most favorable compressed texture data is selected utilizing a comparison operation, and the most favorable compressed texture data is stored in the memory;
    wherein the most favorable compressed texture data provides the most accurate replication of an original version of the texture data.

2. The method as recited in claim 1, and further comprising storing a mode identifier with the compressed texture data.

3. The method as recited in claim 2, wherein the at least one of the plurality of compression algorithms associated with the compressed texture data is identified utilizing the mode identifier.

4. The method as recited in claim 3, wherein the mode identifier includes a mode bit.

5. The method as recited in claim 1, wherein at least one of the compression algorithms represents a 4×4 block of texels of the texture data utilizing two bits per texel only if the texels are opaque, each 4×4 block of texels including two 16-bit colors stored in an RGB 565 format and two additional colors created by interpolating between the two 16-bit colors stored in the RGB 565 format to form a 4-entry lookup table, where a 2-bit index is adapted for being used to determine which 16-bit color from the lookup table is used for each texel of the 4×4 block of texels, and transparent texels are represented by making one of the four 16-bit colors transparent.

6. The method as recited in claim 1, wherein at least one of the compression algorithms represents a 4×8 block of texels utilizing two bits per texel only if the texels are opaque, each 4×8 block of texels including four 15-bit colors in an RGB 555 format to form a 4-entry lookup table, a 2-bit index is adapted for being used to determine which of the four 15-bit colors is assigned to each texel.

7. The method as recited in claim 1, wherein the most favorable compressed texture data is selected by comparing errors associated with each of the compression algorithms.

8. The method as recited in claim 7, wherein the errors are calculated after decompression of the texture data that occurs after the compression thereof.

9. A multi-mode texture decompression method for use during graphics processing, comprising:
  (a) sending a request for compressed texture data to memory;
  (b) receiving the compressed texture data from the memory;
  (c) identifying at least one of a plurality of compression algorithms associated with the compressed texture data; and
  (d) decompressing the compressed texture data in accordance with the identified compression algorithm:
    wherein at least one of the compression algorithms represents a 4×8 block of texels utilizing three bits per texel, each 4×8 block of texels including two 15-bit colors stored in an RGB 555 format and five additional colors created by interpolating between the two 15-bit colors stored in the RGB 555 format to form an 8-entry lookup table, where an eighth 15-bit color is defined to be a transparent color, and a 3-bit index is used to determine which 15-bit color from the lookup table is used for each texel in the 4×8 block of texels.

10. A multi-mode texture decompression method for use during graphics processing, comprising:
(a) sending a request for compressed texture data to memory;
(b) receiving the compressed texture data from the memory;
(c) identifying at least one of a plurality of compression algorithms associated with the compressed texture data; and
(d) decompressing the compressed texture data in accordance with the identified compression algorithm:
wherein at least one of the compression algorithms represents a 4×8 block of texels by two bits per texel, each 4×8 block of texels including three 20-bit colors stored in a 5555 format, where a first and second one of the 20-bit colors are used for primary colors of a left 4×4 sub-block of the 4×8 block of texels, and a second and third one of the colors are used for primary colors of the right 4×4 sub-block of the 4×8 block of texels, where two additional 20-bit colors are created in each 4×4 sub-block of texels by interpolating between the 20-bit colors associated with the corresponding 4×4 sub-block of texels, where a 2-bit index is adapted for being used to determine which of the four 20-bit colors is assigned to each texel, and a lookup table is used to determine which 20-bit color is applied to each texel.

11. A multi-mode texture decompression computer program product embodied on a computer readable medium for use during graphics processing, comprising;
(a) computer code for sending a request for compressed texture data to memory;
(b) computer code for receiving the compressed texture data from the memory;
(c) computer code for identifying at least one of a plurality of compression algorithms associated with the compressed texture data; and
(d) computer code for decompressing the compressed texture data in accordance with the identified compression algorithm;
wherein, prior to sending the request, the texture data is compressed utilizing each of the plurality of compression algorithms, the most favorable compressed texture data is selected utilizing a comparison operation, and the most favorable compressed texture data is stored in the memory;
wherein the most favorable compressed texture data provides the most accurate replication of an original version of the texture data.

12. The computer program product as recited in claim 11, wherein the most favorable compressed texture data is selected by comparing errors associated with each of the compression algorithms.

13. The computer program product as recited in claim 12, wherein the errors are calculated after decompression of the texture data that occurs after the compression thereof.

14. A multi-mode texture decompression system for use during graphics processing, comprising;
(a) a texture fetch module adapted for sending a request for compressed texture data to memory, and receiving the compressed texture data from the memory;
(b) a format detection module adapted for identifying at least one of a plurality of compression algorithms associated with the compressed texture data; and
(c) a plurality of decompression modules coupled between the texture fetch module and the format detection module, the decompression modules adapted for decompressing the compressed texture data in accordance with the compression algorithm identified by the format detection module:
wherein, prior to sending the request, the texture data is compressed utilizing each of the plurality of compression algorithms, the most favorable compressed texture data is selected utilizing a comparison operation, and the most favorable compressed texture data is stored in the memory;
wherein the most favorable compressed texture data provides the most accurate replication of an original version of the texture data.

15. The system as recited in claim 14, wherein at least one of the compression algorithms represents a 4×4 block of texels of the texture data utilizing two bits per texel only if the texels are opaque, each 4×4 block of texels including two 16-bit colors stored in an RGB 565 format and two additional colors created by interpolating between the two 16-bit colors stored in the RGB 565 format to form a 4-entry lookup table, where a 2-bit index is adapted for being used to determine which 16-bit color from the lookup table is used for each texel of the 4×4 block of texels, and transparent texels are represented by making one of the four 16-bit colors transparent.

16. The system as recited in claim 12, wherein at least one of the compression algorithms represents a 4×8 block of texels utilizing two bits per texel only if the texels are opaque, each 4×8 block of texels including four 15-bit colors in an RGB 555 format to form a 4-entry lookup table, a 2-bit index is adapted for being used to determine which of the four 15-bit colors is assigned to each texel.

17. The system as recited in claim 14, wherein the most favorable compressed texture data is selected by comparing errors associated with each of the compression algorithms.

18. The system as recited in claim 17, wherein the errors are calculated after decompression of the texture data that occurs after the compression thereof.

19. A multi-mode texture decompression system for use during graphics processing, comprising:
(a) a texture fetch module adapted for sending a request for compressed texture data to memory, and receiving the compressed texture data from the memory;
(b) a format detection module adapted for identifying at least one of a plurality of compression algorithms associated with the compressed texture data; and
(c) a plurality of decompression modules coupled between the texture fetch module and the format detection module, the decompression modules adapted for decompressing the compressed texture data in accordance with the compression algorithm identified by the format detection module:
wherein at least one of the compression algorithms represents a 4×8 block of texels utilizing three bits per texel, each 4×8 block of texels including two 15-bit colors stored in an RGB 555 format and five additional colors created by interpolating between the two 15-bit colors stored in the RGB 555 format to form an 8-entry lookup table, where an eighth 15-bit color is defined to be a transparent color, and a 3-bit index is used to determine which 15-bit color from the lookup table is used for each texel in the 4×8 block of texels.

20. A multi-mode texture decompression system for use during graphics processing, comprising:
(a) a texture fetch module adapted for sending a request for compressed texture data to memory, and receiving the compressed texture data from the memory;
(b) a format detection module adapted for identifying at least one of a plurality of compression algorithms associated with the compressed texture data; and (c) a plurality of decompression modules, coupled between the texture fetch module and the format detection module, the decompression modules adapted for decompressing the compressed texture data in accordance with the compression algorithm identified by the format detection module:
wherein at least one of the compression algorithms represents a 4×8 block of texels by two bits per texel, each 4×8 block of texels including three 20-bit colors stored in a 5555 format, where a first and second one of the 20-bit colors are used for primary colors of a left 4×4 sub-block of the 4×8 block of texels, and a second and third one of the colors are used for primary colors of the right 4×4 sub-block of the 4×8 block of texels, where two additional 20-bit colors are created in each 4×4 sub-block of texels by interpolating between the 20-bit colors associated with the corresponding 4×4 sub-block of texels, where a 2-bit index is adapted for being used to determine which of the four 20-bit colors is assigned to each texel, and a lookup table is used to determine which 20-bit color is applied to each texel.

21. A multi-mode texture decompression system for use during graphics processing, comprising;
(a) means for sending a request for compressed texture data to memory;
(b) means for receiving the compressed texture data from the memory;
(c) means for identifying at least one of a plurality of compression algorithms associated with the compressed texture data; and
(d) means for decompressing the compressed texture data in accordance with the identified compression algorithm:
wherein, prior to sending the request, the texture data is compressed utilizing each of the plurality of compression algorithms the most favorable compressed texture data is selected utilizing a comparison operation, and the most favorable compressed texture data is stored in the memory;
wherein the most favorable compressed texture data provides the most accurate replication of an original version of the texture data.

22. A multi-mode texture compression method for use during graphics processing, comprising;
(a) compressing texture data utilizing each of a plurality of compression algorithms in parallel;
(b) selecting the most favorable compressed texture data using a comparison operation;
(c) storing the most favorable compressed texture data in memory;
(d) storing a mode bit with the most favorable compressed texture data in the memory;
(e) sending a request for the compressed texture data to the memory;
(f) receiving the compressed texture data from the memory;
(g) determining the mode bit associated with the received compressed texture data;
(h) identifying at least one of the plurality of compression algorithms associated with the compressed texture data based on the mode bit; and
(i) decompressing the compressed texture data in accordance with the identified compression algorithm:
wherein the most favorable compressed texture data provides the most accurate replication of an original version of the texture data.

23. A multi-mode texture compression method for use during graphics processing, comprising;
(a) compressing texture data utilizing each of a plurality of compression algorithms in parallel;
(b) selecting the most favorable compressed texture data using a comparison operation;
(c) storing the most favorable compressed texture data in memory; and
(d) storing a mode bit with the most favorable compressed texture data in the memory;
(e) wherein the mode bit associated with the received compressed texture data is capable of being used to identify at least one of the plurality of compression algorithms associated with the compressed texture data such that the compressed texture data is capable of being decompressed in accordance with the identified compression algorithm;
(f) wherein the most favorable compressed texture data provides the most accurate replication of an original version of the texture data.

24. A data structure stored in memory for compressing texture data representing a Y×Z block of texels utilizing three bits per texel, each Y×Z block of texels including two X-bit colors stored in a predetermined format and five additional colors created by interpolating between the two X-bit colors stored in the predetermined format to form a lookup table, where an eighth X-bit color is defined to be a transparent color, and a W-bit index is used to determine which X-bit color from the lookup table is used for each texel in the Y×Z block of texels, wherein the compressed texture data is used during graphics processing.

25. A data structure stored in memory for compressing texture data representing a Y×Z block of texels utilizing two bits per texel only if the texels are opaque, each Y×Z block of texels including four X-bit colors in a predetermined format to form a lookup table, a W-bit index is adapted for being used to determine which of the four X-bit colors is assigned to each texel, wherein the compressed texture data is used during graphics processing.

26. A data structure stored in memory for compressing texture data representing a Y×Z block of texels by two bits per texel, each Y×Z block of texels including three X-bit colors stored in a predetermined format, where a first and second one of the X-bit colors are used for primary colors of a left Y×Y sub-block of the Y×Z block of texels, and a second and third one of the colors are used for primary colors of the right Y×Y sub-block of the Y×Z block of texels, where two additional X-bit colors are created in each Y×Y sub-block of texels by interpolating between the X-bit colors associated with the corresponding Y×Y sub-block of texels, where a W-bit index is adapted for being used to determine which of the four X-bit colors is assigned to each texel, and a lookup table is used to determine which X-bit color is applied to each texel, wherein the compressed texture data is used during graphics processing.

* * * * *

UNITED STATES PATENT AND TRADEMARK OFFICE
CERTIFICATE OF CORRECTION

| | |
|---|---|
| PATENT NO. | : 6,959,110 B1 |
| APPLICATION NO. | : 09/929427 |
| DATED | : October 25, 2005 |
| INVENTOR(S) | : Danskin et al. |

It is certified that error appears in the above-identified patent and that said Letters Patent is hereby corrected as shown below:

Col. 16, line 5, please replace "algorithm:" with --algorithm;--;
Col. 16, line 59, please replace "algorithm:" with --algorithm;--;
Col. 17, line 14, please replace "algorithm:" with --algorithm;--;
Col. 18, line 6, please replace "module:" with --module;--;
Col. 18, line 54, please replace "module:" with --module;--;
Col. 19, line 14, please replace "module:" with --module;--;
Col. 19, lines 41-42, please replace "algorithm:" with --algorithm;--;
Col. 20, line 5, please replace "algorithm:" with --algorithm;--.

Signed and Sealed this
Twelfth Day of March, 2013

Teresa Stanek Rea
*Acting Director of the United States Patent and Trademark Office*